(12) United States Patent
Boden et al.

(10) Patent No.: US 6,993,037 B2
(45) Date of Patent: Jan. 31, 2006

(54) SYSTEM AND METHOD FOR VIRTUAL PRIVATE NETWORK NETWORK ADDRESS TRANSLATION PROPAGATION OVER NESTED CONNECTIONS WITH COINCIDENT LOCAL ENDPOINTS

(75) Inventors: Edward B. Boden, Vestel, NY (US); Franklin A. Gruber, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 09/813,910

(22) Filed: Mar. 21, 2001

(65) Prior Publication Data

US 2002/0136210 A1    Sep. 26, 2002

(51) Int. Cl.
*H04L 12/28* (2006.01)
*H04L 12/56* (2006.01)

(52) U.S. Cl. .................................. 370/401; 370/466
(58) Field of Classification Search ............. 370/389, 370/392, 401, 474, 475
See application file for complete search history.

(56) References Cited

U.S. PATENT DOCUMENTS

| | | | |
|---|---|---|---|
| 5,390,173 A | 2/1995 | Spinney et al. | 370/60 |
| 5,428,615 A | 6/1995 | Backes et al. | 370/85.13 |
| 5,636,216 A | 6/1997 | Fox et al. | 370/402 |
| 5,651,002 A | 7/1997 | Van Seters et al. | 370/392 |
| 5,856,974 A | 1/1999 | Gervais et al. | 370/392 |
| 5,978,858 A | 11/1999 | Bonola et al. | 710/1 |
| 6,061,349 A | 5/2000 | Colle et al. | 370/389 |
| 6,282,193 B1 * | 8/2001 | Hluchyj et al. | 370/356 |

OTHER PUBLICATIONS

P. Srisuresh. "RFC 2709—Security Model with Tunnel-mode IPsec for NAT Domains". Network Working Group, RFC 2709. Oct. 1999. pp. 1-9.*

* cited by examiner

*Primary Examiner*—Huy D. Vu
*Assistant Examiner*—Daniel Ryman
(74) *Attorney, Agent, or Firm*—Shelly M. Beckstrand

(57) ABSTRACT

A communication network includes a plurality of nodes, selectively including a client, a remote gateway Internet service provider, the Internet, a local enterprise gateway, and an enterprise internal network. A local coincident endpoint is established at the local gateway for an outer connection with a remote node and an inner connection with the same or a different remote node. Nested traffic received at the gateway on the outer connection is decapsulated and then source-in NATed. Traffic received at the gateway for transmission on the outer connection is first source-in NATed, and then encapsulated for communication on the outer connection.

20 Claims, 4 Drawing Sheets

SYSTEM AND METHOD FOR VIRTUAL PRIVATE NETWORK NETWORK ADDRESS TRANSLATION PROPAGATION OVER NESTED CONNECTIONS WITH COINCIDENT LOCAL ENDPOINTS

CROSS REFERENCES TO RELATED APPLICATIONS

U.S. patent application Ser. No. 09/813,911, entitled "SYSTEM AND METHOD FOR NESTING VIRTUAL PRIVATE NETWORKING CONNECTIONS WITH COINCIDENT ENDPOINTS", filed concurrently herewith, and U.S. patent application Ser. No. 09/240,720 filed 29 Jan. 1999 by Edward B. Boden and Franklin A. Gruber for "SYSTEM AND METHOD FOR NETWORK ADDRESS TRANSLATION INTEGRATION WITH IP SECURITY", now U.S. Pat. No. 6,615,357, issued 2 Sep. 2003, are assigned to the same assignee hereof and contain subject matter related, in certain respect, to the subject matter of the present application. The above-identified patent applications are incorporated herein by reference.

BACKGROUND OF THE INVENTION

1. Technical Field of the Invention

This invention pertains to network communications. More particularly, it relates to network address translation (NAT) propagation over nested virtual private network (VPN) tunnels, or connections, with coincident local endpoints.

2. Background Art

An important use of virtual private networking (VPN) is to allow a remote user or small branch office to connect to an enterprise via the Internet. The basic scenario for so doing is illustrated in FIG. 1. Personal computer (PC) 10 represents a remote user, or client, connecting through an Internet Service Provider (ISP, such as SprintNet, AT&T, AOL, or the like) 12 via Internet 14 to a VPN gateway 16 (also referred to as an enterprise gateway) for the enterprise. Typically in this scenario the user at PC 10 desires to connect to some server, such as a Lotus Notes server, within the internal network 18 of a company or enterprise.

A typical configuration for doing this connection of PC 10 to a server within internal network 18 uses two VPN connections (also referred to as tunnels) t1 20 and t2 22. Connection t1 20 begins at ISP 12 and ends at gateway 16.

Connection t2 begins at PC 10, is nested within connection t1 20, then continues on to the company server internal to network 18. (By "Internet", reference is made to a specific internet—the one usually referred to today. This "Internet" is implemented by a well defined set of system routers, available from many vendors. By "internet", reference is usually made to any network that has its own well defined domain, routing, and other properties. These networks are usually TCP/IP based.) ISP's 12 are generally located outside of Internet 14, but not always. IBM, for example, connects directly to an AT&T ISP which is inside the Internet.

If PC 10 has a dedicated, or permanent, Internet Protocol (IP) address, this all works fine. However, it much more likely that PC 10 has an IP address which is dynamically assigned by ISP 12 and which may be, in general, from one of several designated private IP address ranges. This raises the possibility, if not likelihood, of the same IP address being assigned to a plurality of clients 10 seeking access through gateway 16. To support such remote users 10, the company gateway 16 needs some way to handle the dynamically assigned and possibly overlapping IP addresses assigned to these remote systems, and allow it through to its internal network 18.

Network address translation (NAT) is a widely-deployed approach by which an enterprise can support remote users while avoiding address collisions within its own internal network. However, NAT is incompatible with VPN for architectural reasons. U.S. patent application Ser. No. 09/240,720, now U.S. Pat. No. 6,615,357, issued 2 Sep. 2003, and other applications therein referenced, provide a solution that integrates NAT with VPN.

It is an object of the invention to provide an improved method and system for managing connections within a communications system.

It is a further object of the invention to provide an improved method and system for connecting a remote client to an enterprise network through a local gateway.

It is a further object of the invention to provide a method and system for enabling an enterprise gateway to handle dynamically assigned IP addresses from remote clients.

It is a further object of the invention to provide an improved method and system for supporting nested connections with coincident endpoints.

It is a further object of the invention to provide a method and system for supporting automatically nested connections with coincident endpoints (without requiring customer configuration).

It is a further object of the invention to provide a method and system for implementing nested connections by automatically detecting and establishing connections so as to achieve a nested implementation.

It is a further object of the invention to provide a system and method which extends VPN NAT to include support for nested connections with coincident endpoints, without requiring any special configuration for the inner (nested) VPN connection, with respect to VPN NAT.

It is a further object of the invention to provide a method and system for providing, without customer configuration, tunnel or transport mode IP security (IPsec) at a remote endpoint, with the VPN role of the remote endpoint being host or gateway, with L2TP supported within the internal connection, and with an arbitrary level of connection nesting.

SUMMARY OF THE INVENTION

A system and method for operating a first node in a network including at least one second node. A coincident endpoint for an outer connection and an inner connection with respect to at least one second node is established at the first node. Responsive to receiving a nested packet from the second node on the outer connection, the first node decapsulates the packet into a raw packet and then performs source-in network address translation on the raw packet. Responsive to receiving a raw packet at the inner connection, the translation inverse for source-in network address translation is performed on the raw packet, which is then encapsulated into a nested packet for communication on the outer connection to the second node.

In accordance with an aspect of the invention, there is provided a computer program product configured to be operable to perform network address translation on raw packets selectively decapsulated from nested packets received at, or to be encapsulated for sending from, an outer connection at a coincident endpoint of inner and outer connections in a communications network.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiment of the invention, a system and method is provided for an enterprise to support remote users while avoiding address collisions within its own internal network.

Figure 1:
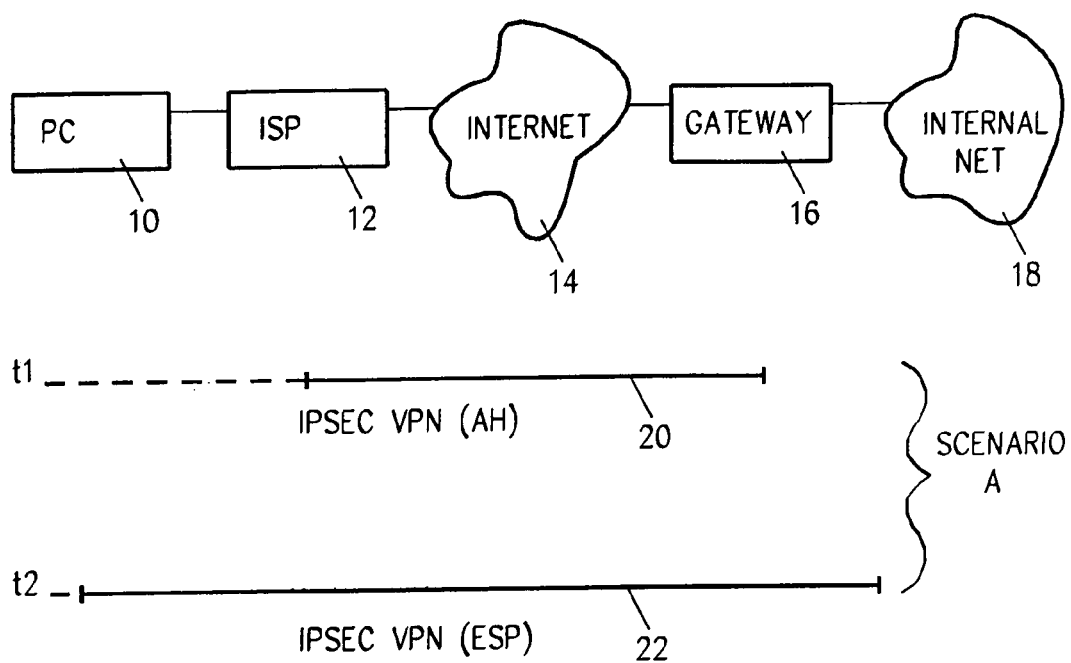
FIG. 1 is system and tunneling diagram illustrating a typical client/server connection in accordance with the prior art.
Figure 2:
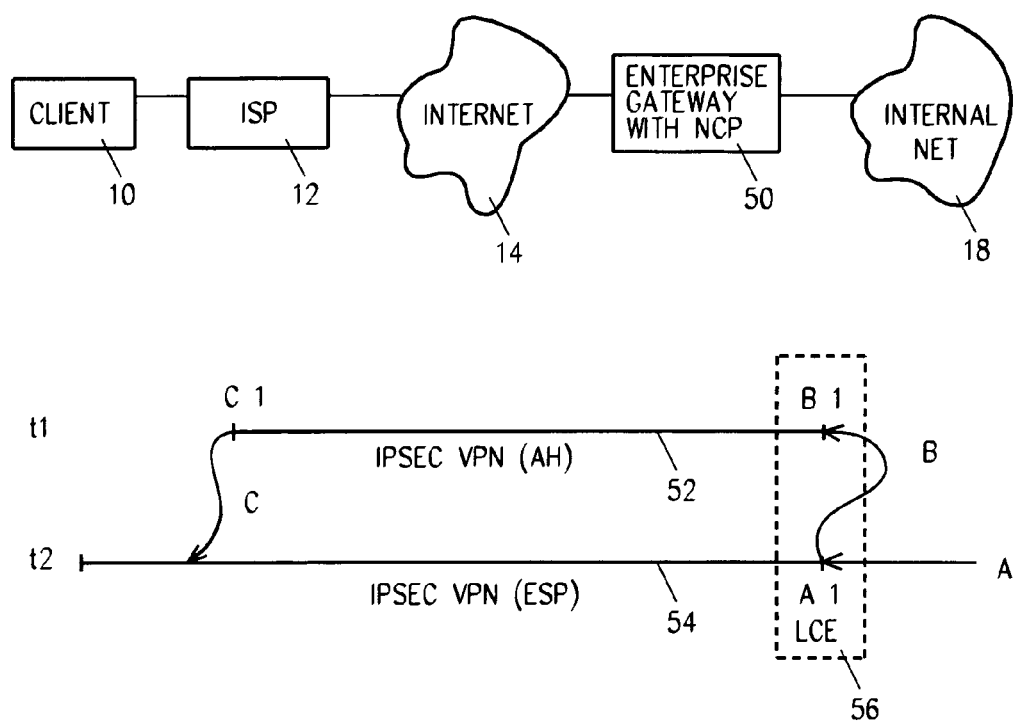
FIG. 2 is a system and tunneling diagram illustrating a client/server connection via local coincident endpoints with VPN NAT propagation in accordance with the preferred embodiments of the invention.

In copending U.S. patent application, Ser. No. 09/813,911, filed concurrently herewith FIG. 2, scenario C illustrates the solution to definition of client IP addresses by using a third encapsulation on the L2TP connection to assign routable IP address known to the enterprise (represented by enterprise gateway 16.) Referring to FIG. 2 in the present application, another solution, based on VPN NAT, is illustrated which has the advantage of not requiring a third encapsulation. Together, these form a full solution for a remote VPN user 10.

Referring to FIG. 2, client 10 may be, for example, a personal computer with an IP address dynamically assigned by Internet service provider (ISP) 12. As noted above, the problem that a dynamically assigned IP address creates is that, in general, the enterprise gateway 50 cannot know, a priori, about the dynamically assigned IP address. This is so because of different address domains assigned to different ISPs 12, and because ISPs 12 may assign IP addresses out of one of the ranges designated for private (non-internal) use.

In accordance with the preferred embodiment of the invention, NAT is performed on datagrams arriving at both outer connection t1 52 and inner connection t2 54, with the same NAT rule applied at the both connections without requiring special configuration of NAT on both connections. Further, support is provided for an arbitrary number of nested connections, with each nested connection in either the transport or tunnel mode, and remote client 10 may be a VPN gateway in addition to being a VPN host. Common usage of the term "tunnel" refers to a VPN connection, which comes in two modes: tunnel mode and transport mode. A tunnel is a VPN connection. However, in the present invention, tunnels t1 52 and t2 54 are IPsec-based VPNs, and will be, therefore, referred to as connections.

Figure 4:
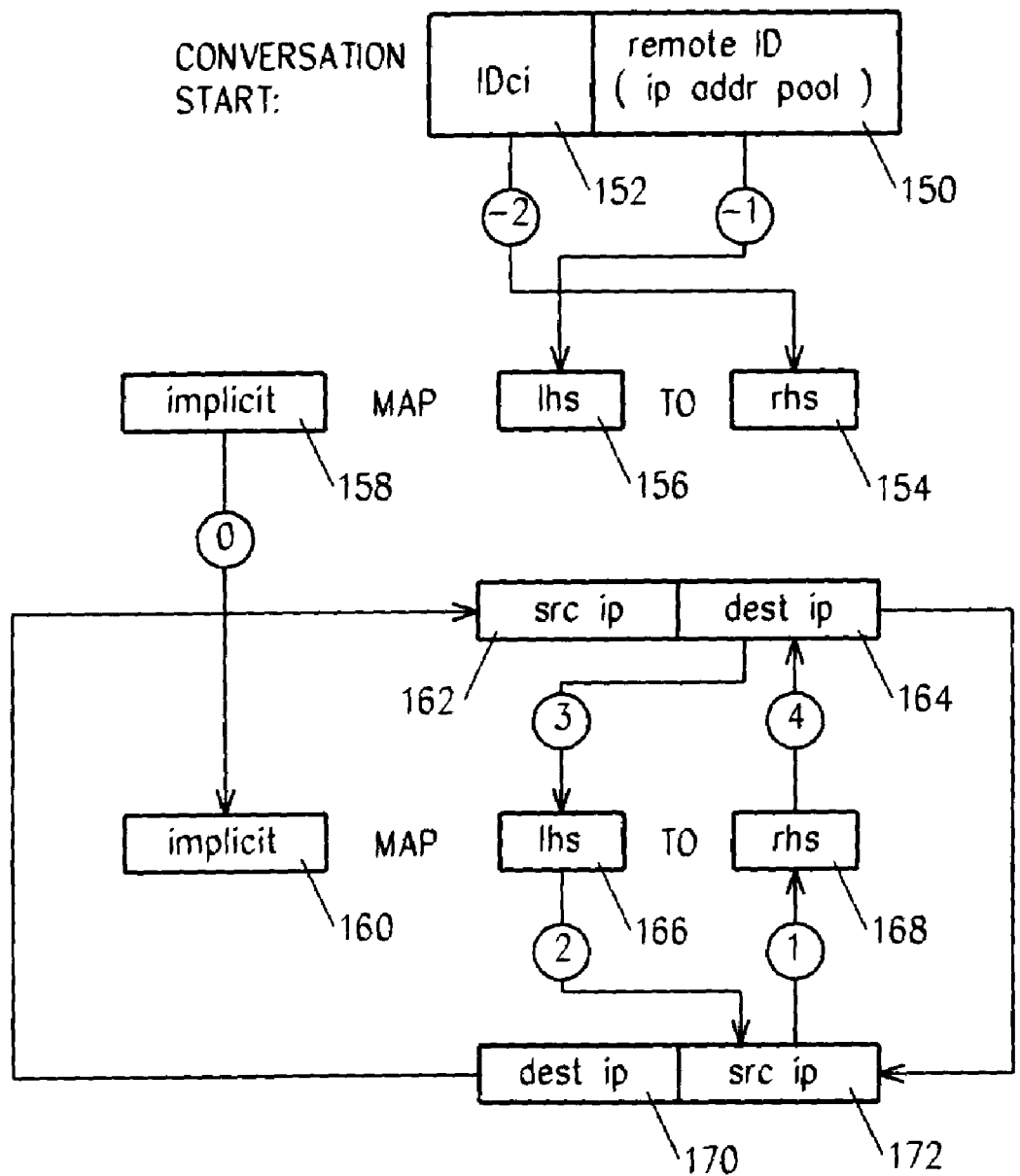
FIG. 4 illustrates VPN NAT, type c: IDci translated for responder-mode conversations (also known as 'source-in' VPN NAT). This FIG. 4 corresponds to FIG. 6 of U.S. patent application Ser. No. 09/240,720, filed 29 Jan. 1999, now U.S. Pat. No. 6,615,357, issued 2 Sep. 2003.

VPN NAT type 'source-in', as described hereafter in connection with FIG. 4, is applied to (configured for) outer connection t1 52. In this manner, the dynamic IP address of remote client 10 is translated to an enterprise internal network 18 compatible IP address when it arrives in outer connection t1 52. When inner connection t2 54 is loaded, after the connection t2 outbound security association (SA) is chained to outer connection t1 52, the chain is scanned for the last SA. Any VPN NAT rules associated with the last SA are propagated to the outer-most outbound SA. The new outbound SA is updated with the VPN NAT rules. This setup is done once, during connection t2 54 load. During datagram traffic processing, the VPN NAT rule(s) are applied to a datagram (that is, packet) before the datagram is processed for IPsec for the inner tunnel.

IP security (IPsec) is provided in a virtual private network using network address translation (NAT) by performing one or a combination of the three types of VPN NAT. In FIG. 4 is described the source-in VPN NAT type used in the present invention. This involves dynamically generating NAT rules and associating them with the dynamically generated (IKE) Security Associations, before beginning IP security that uses the Security Associations. Then, as IP Sec is performed on outbound and inbound datagrams, the NAT function is also performed.

VPN NAT rules are propagated for inbound processing from outer connection t1 52 to inner connection t2 54 dynamically rather than statically. After processing an inbound datagram for a outer connection t1 52 inbound SA, if the next header is IPsec and the destination IP address is local, a check is made for any VPN NAT rules. If found, they are propagated to the next inbound SA. After IPsec processing, if the resulting datagram does not have an IPsec next header, the VPN NAT rule(s) are applied.

Figure 3:
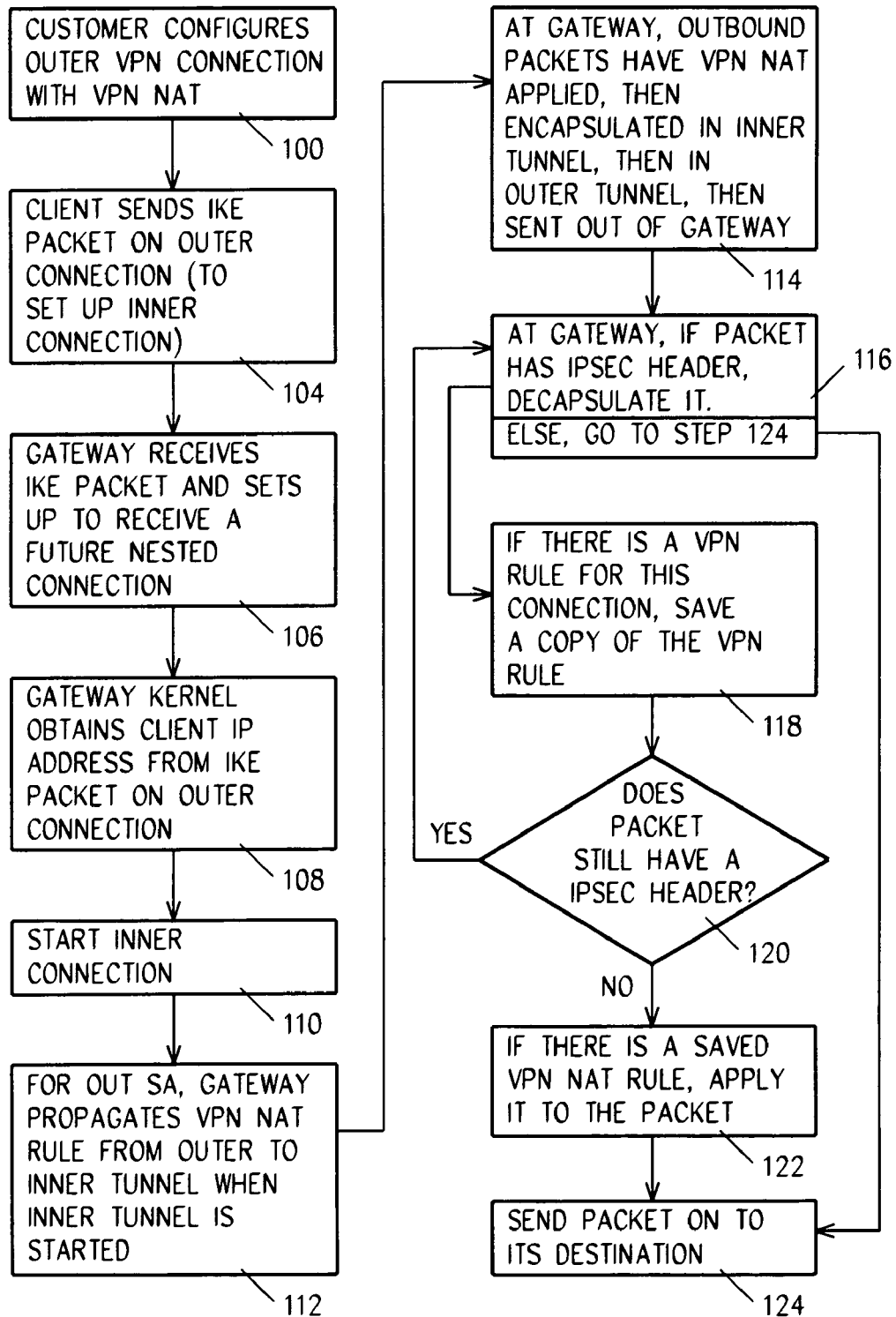
FIG. 3 is a flow diagram illustrating selected steps of the preferred embodiment of the method of the invention.

Referring to FIG. 3 in connection with FIG. 2, the method of a preferred embodiment of the invention will be described.

In step 100, customer (that is, client) 10 configures outer VPN connection with VPN NAT.

In step 104, client 10 initiates IKE processing on outer connection t1 52 to set up a secure inner connection t2 54.

In step 106, gateway 50 receives the first IKE packet on outer connection t1 52 and recognizes therefrom that client 10 is initializing a nested or inner connection.

In step 108, gateway 50 obtains the client IP address (dynamically assigned previously by ISP 12) from the first IKE packet on outer connection t1 52, and saves it for future processing.

In step 110, inner connection 54 is started. In the scenarios which apply to the present invention, inner connections t2 54 are initiated by client 10. More specifically, the inner connection t2 for both this application and for copending application Ser. No. 09/813,911, filed concurrently herewith are initiated remotely (with respect to the gateway 50).

In step 112, for outbound SA, gateway propagates VPN NAT rule from outer tunnel t1 52 to inner tunnel t2 54, when the inner tunnel t2 is started. (Steps 100–112 represent setup. Steps 114–124 which follow describe key aspects of how packets are handled.)

In step 114, at the gateway 50, outbound packets have VPN NAT applied, are then encapsulated in the inner tunnel, then encapsulated in the outer tunnel, and then sent on its way (out of the gateway).

In step 116, at the gateway 50, if the packet has an IPsec header, it is decapsulated. Else, processing skips to step 124.

In step 118, if there is a VPN NAT rule for this connection, a copy of the VPN NAT rule is saved. In either case, processing continues to step 120.

In step 120, the packet is examined to determine if more IPsec processing is required. That is, does the packet still have a IPsec header? If yes, processing returns to step 116; otherwise, it continues on to step 122.

In step 122, if there is a saved VPN NAT rule, then it is applied to the packet.

In step 124, the packet is sent on to its destination.

For both outbound and inbound traffic with respect to gateway 50 (the location in this case of the coincident local endpoints), the appropriate VPN NAT rule is applied to the packet without any IPsec header(s). So, on outbound, this is the state of the packet just before IPsec, and on inbound, this is the state of the packet just after IPsec.

Referring further to FIG. 2, traffic flow for outbound traffic from network 18 at point A is to local coincident endpoint 56 point A1 or for encapsulation on inner connection t2 54; it is here NAT occurs on packets before IPsec is applied, then encapsulated in the inner t2 54 tunnel. From point A1, the packet is logically encapsulated in outer connection at point B1, decapsulated at ISP 12 point C1, flows to inner connection t2 54 and is finally decapsulated at client 10. Traffic flowing from client 10 to network 18 follows the reverse path, with decapsulation and encapsulation also reversed. Encapsulation involves adding headers to a packet, and decapsulation removes those headers.

Referring to FIG. 4, VPN NAT source-in executes to translate IDci for responder-mode conversations as follows: in step <−2>, for remotely initiated conversations, at start, since NAT is requested, implicit MAP rule 158 <MAP ihs TO rhs> is created, copying responder mode NAT flag IDci 152 to rhs 154. In step <−1>, the ip address is obtained from the appropriate pool 150 (associated with IDir) and copied to lhs 156. In step <0>, after IKE negotiation is complete using rhs 154, implicit rule 160 is loaded. When processing inbound packets, if in step <1> src ip 172 matches rhs 168, in step <2> source ip 172 is translated to lhs 166. When processing outbound datagrams, if in step <3> destination 164 matches lhs 166, in step <4> destination ip 164 is translated to rhs 168. (Note that the inbound destination IP address 170 and the outbound source IP address 162 are not changed.).

In accordance with the preferred embodiments of the invention, for traffic outbound at gateway 50, inner connection (sometimes referred to as a tunnel) t2 54 inherits the VPN NAT of outer connection t1 52. Enterprise gateway 50, or wherever the coincident endpoint may be (coincident endpoint 56 is shown at gateway 50) does not initiate the connection t1/t2, but rather this is done remotely, in the example of FIG. 2, from client 10 and ISP 12. During setup of inner connection t2 54, during IKE negotiation first packet, gateway 50 kernel obtains the IP address of client 10—and this is referred to as source inbound NATing. That is, gateway 50 kernel NATs the source IP address that came in outer connection t1 52, which does address translation on the source IP address of the IKE traffic before the inner connection t2 54 is established.

For inbound traffic, after connection t1 52 is started however, because connection t2 54 is not chained to connection t1 52, after decapsulation of the inbound packet at point B1, gateway 50 checks to see if the packet is encapsulated inside yet another connection. If so, gateway 50 remembers the VPN NAT rule, decapsulates it out at A1, and then does source-in NAT according to the rule.

For outbound traffic, when a packet goes into inner connection t2 54 at point A1, gateway 50 applys NAT to the packet before any Ipsec is applied. Thus, NATing is done at the coincident endpoint of the innermost connection t2 54 for either inbound or outbound traffic.

Applying VPN NAT to a packet can occur with any depth of nested connections, with inner connections inheriting the NAT rules of outer connections. One NAT rule is placed on the outermost connection t1 52, and all nested connections inherit the NAT rule from that outer connection. Thus, client 10 controls the NAT pool, and the NATing at gateway 50 (LCE 56 point A1) is done to the values provided by client 10 on outer connection t1 t2. The size of the client NAT pool determines how many users may access network 18 through connection t1 52 concurrently.

In accordance with further embodiments of the invention VPN NAT may be broadened to include other forms of tunneling NAT, such as PPP and UDP.

Advantages Over the Prior Art

It is an advantage of the invention that there is provided an improved method and system for managing connections within a communications system.

It is a further advantage of the invention that there is provided an improved method and system for connecting a remote client to an enterprise network through a local gateway.

It is a further advantage of the invention that there is provided a method and system for enabling an enterprise gateway to handle dynamically assigned IP addresses from remote clients.

It is a further advantage of the invention that there is provided an improved method and system for supporting nested connections with coincident endpoints.

It is a further advantage of the invention that there is provided a method and system for supporting nested connections with coincident endpoints without requiring customer configuration.

It is a further advantage of the invention that there is provided a method and system for implementing nested connections by automatically detecting and establishing connections so as to achieve a nested implementation.

It is a further advantage of the invention that a gateway is able to support multiple concurrent VPN connections from multiple remote ISP's and the clients connecting through those ISP's may have non-unique IP addresses.

It is a further advantage of the invention that there is provided a system and method which extends VPN NAT to include support for nested connections with coincident endpoints.

It is a further advantage of the invention that there is provided a method and system for providing, without customer configuration, tunnel or transport mode IP security (IPsec) at a remote endpoint, with the VPN role of the remote endpoint being host or gateway, and with an arbitrary level of tunnel nesting.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

While the invention has been described rather specifically to an Internet environment using current technologies (today's Internet is built on IPv4), it applies to any existing or future Internet technology that employs IKE or the equivalent to negotiate VPN, such as IPv6, which is described in RFC 2460.

Accordingly, the scope of protection of this invention is limited only by the following claims and their equivalents.

We claim:

1. Method for operating a first node in a network including at least one second node, comprising the steps of:
    establishing at said first node a coincident endpoint for an outer connection and an inner connection with respect to at least one second node, said outer connection and said inner connection being IP security connections;
    responsive to receiving an inbound nested packet from said second node on said outer connection, decapsulating said packet into a first packet and then performing source-in network address translation on said first packet; and
    responsive to receiving an outbound second packet at said inner connection, performing source-in network address translation on said second packet, and then encapsulating said second packet into a nested packet for communication on said outer connection to said second node.

2. Method for managing nested connections having a coincident endpoint within a communication system, comprising the steps of:
    configuring an outer IP security connection;
    communicating from a client to a gateway on said outer connection a request to configure a secure inner connection having said coincident endpoint with said outer connection;
    responsive to said request, initializing said gateway to receive a future nested communication, including obtaining a client address from a packet on said outer connection;
    starting said inner connection;
    responsive to starting said inner connection, propagating a network address translation rule from said outer connection to said inner connection.

3. The method of claim 2, further comprising the step of:
    further responsive to starting said inner connection, encapsulating a packet outbound from said gateway first in said inner connection and then in said outer connection.

4. The method of claim 3, further comprising the steps of:
    responsive to receiving a packet at said gateway, determining if said packet has a security header;
    responsive to said packet having said security header, decapsulating said packet and saving any address translation rule included within said packet; and
    applying said address translation rule to said packet and thereafter communicating said packet from said gateway to said client.

5. The method of claim 4, further comprising the steps of:
    iteratively executing said decapsulating step until a resulting decapsulated packet no longer contains a security header.

6. Method for enabling a local gateway to handle dynamically assigned IP addresses from remote clients, comprising the steps of:
    assigning said IP address to a remote client;
    automatically maintaining between said remote client and said gateway nested IP security connections with local coincident endpoints.

7. The method of claim 6, wherein said nested connections comprise an inner connection and an outer connection.

8. The method of claim 7, further comprising the steps of:
    responsive to receiving an inbound nested packet from said client on said outer connection, decapsulating said packet into a first packet and then performing source-in network address translation on said first packet; and
    responsive to receiving an outbound second packet at said inner connection, performing source-in network address translation on said second packet, and then encapsulating said second packet into a nested packet for communication on said outer connection to client.

9. System for operating a first node in a network including at least one second node, comprising:
    an inner IP security connection;
    an outer IP security connection;
    a local coincident endpoint for said outer connection and said inner connection at said first node with respect to at least one second node;
    said first node being responsive to receiving an inbound nested packet from said second node on said outer connection for decapsulating said packet into a first packet and then performing source-in network address translation on said first packet; and
    said first node being further responsive to receiving an outbound second packet at said inner connection for performing source-in network address translation on said second packet, and then encapsulating said second packet into a nested packet for communication on said outer connection to said second node.

10. Method for extending virtual private network (VPN) network address translation (NAT) to include support for nested connections with coincident endpoints, without requiring any special configuration for the inner (nested) VPN connection, with respect to VPN NAT, comprising the steps of:
    configuring an outer IP security connection with a VPN NAT rule;
    communicating from a client to a gateway on said outer connection a dynamically generated security association request packet to configure a secure inner connection;
    responsive to said request, initializing said gateway to receive a future nested communication, including obtaining a client address from said request packet on said outer connection;
    starting said inner connection;
    responsive to starting said inner connection, propagating said VPN NAT rule from said outer connection to said inner connection, said inner and outer connections having a coincident endpoint.

11. The method of claim 10, further comprising the step of:
further responsive to starting said inner connection, encapsulating a packet outbound from said gateway first in said inner connection and then in said outer connection.

12. The method of claim 11, further comprising the steps of:
responsive to receiving a packet at said gateway, determining if said packet has a security header;
responsive to said packet having said security header, decapsulating said packet and saving any VPN NAT rule included within said packet; and
applying said NAT rule to said packet and thereafter communicating said packet from said gateway to said client.

13. The method of claim 12, further comprising the step of:
iteratively executing said decapsulating step until a resulting decapsulated packet no longer contains a security header.

14. System for extending virtual private network (VPN) network address translation (NAT) to include support for nested connections with coincident endpoints, without requiring any special configuration for the inner (nested) VPN connection, with respect to VPN NAT, comprising:
a gateway;
a client;
an inner IP security connection for connecting said gateway and said client;
an outer IP security connection for connecting said gateway and said client;
said inner and outer IP security connections including a coincident endpoint;
said outer connection being configured by said client with a VPN NAT rule;
said outer connection for communicating from said client to said gateway a dynamically generated security association request packet to configure said inner connection;
said gateway further responsive to said request for initializing said gateway to receive a future nested communication, including obtaining a client address from said request packet on said outer connection;
said gateway further responsive to starting said inner connection for propagating said VPN NAT rule from said outer connection to said inner connection.

15. A program storage device readable by a machine, tangibly embodying a program of instructions executable by a machine to perform method steps for operating a first node in a network including at least one second node, said method steps comprising:
establishing at said first node a coincident endpoint for an outer connection and an inner connection with respect to at least one second node, said outer connection and said inner connection being IP security connections;
responsive to receiving an inbound nested packet from said second node on said outer connection, decapsulating said packet into a first packet and then performing source-in network address translation on said first packet; and
responsive to receiving an outbound second packet at said inner connection, performing source-in network address translation on said second packet, and then encapsulating said second packet into a nested packet for communication on said outer connection to said second node.

16. A computer program product or computer program element for operating a first node in a network including at least one second node according to the steps of:
establishing at said first node a coincident endpoint for an outer connection and an inner connection with respect to at least one second node, said outer connection and said inner connection being IP security connections;
responsive to receiving an in bound nested packet from said second node on said outer connection, decapsulating said packet into a first packet and then performing source-in network address translation on said first packet; and
responsive to receiving an outbound second packet at said inner connection, performing source-in network address translation on said second packet, and then encapsulating said second packet into a nested packet for communication on said outer connection to said second node.

17. A program storage device readable by a machine, tangibly embodying a program of instructions executable by a machine to perform method steps for managing nested connections with a coincident endpoint within a communications system, said method steps comprising:
configuring an outer IP security connection;
communicating from a client to a gateway on said outer connection a request to configure a secure inner connection;
responsive to said request, initializing said gateway to receive a future nested communication, including obtaining a client address from a packet on said outer connection;
starting said inner connection;
responsive to starting said inner connection, propagating a network address translation rule from said outer connection to said inner connection.

18. The storage device of claim 17, said method steps further comprising the step of:
further responsive to starting said inner connection, encapsulating a packet outbound from said gateway first in said inner connection and then in said outer connection.

19. The storage device of claim 18, said method steps further comprising the steps of:
responsive to receiving a packet at said gateway, determining if said packet has a security header;
responsive to said packet having said security header, decapsulating said packet and saving any address translation rule included within said packet; and
applying said address translation rule to said packet and thereafter communicating said packet from said gateway to said client.

20. The storage device of claim 19, said method steps further comprising the steps of:
iteratively executing said decapsulating step until a resulting decapsulated packet no longer contains a security header.

* * * * *